Feb. 13, 1923.
W. SCHAAKE.
TROLLEY BASE.
FILED OCT. 9, 1920.
1,444,983.
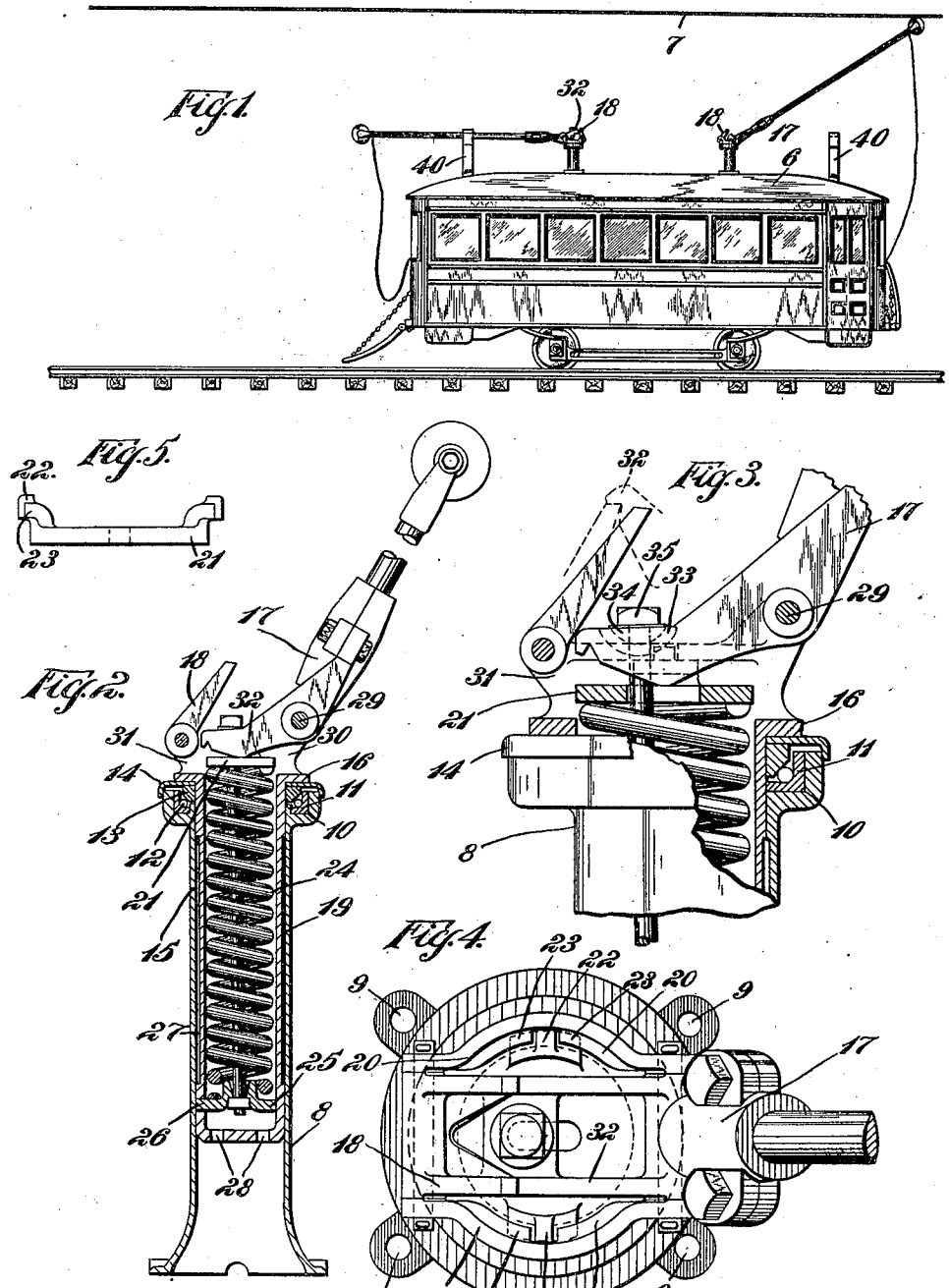
WITNESSES:
INVENTOR
William Schaake
BY
Wesley G. Carr
ATTORNEY Patented Feb. 13, 1923.

1,444,983

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY BASE.

Application filed October 9, 1920. Serial No. 415,790.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Trolley Bases, of which the following is a specification.

My invention relates to trolley bases and more particularly to means for holding a trolley pole in yielding engagement with a trolley wire and for allowing the necessary rotative movement of the trolley pole about its base.

The object of the invention is to provide a simple and compact base which may be very easily assembled and may be readily taken apart for replacement or repairs.

This invention is an improvement over the device of my Patent No. 1,175,305, issued March 14, 1916, and differs therefrom principally by the provision of a casing within which the bearing sleeve is rotatably supported on a frictionless bearing; which casing has a base portion adapted to be secured to the top of a car.

My invention is illustrated, in preferred form, in the accompanying drawing, wherein:—

Figure 1 is a side elevational view of a trolley car having my device applied thereto;

Fig. 2 is a partially sectional view, in side elevation, of a trolley base embodying my invention.

Fig. 3 is a view, similar to that of Fig. 2, on an enlarged scale.

Fig. 4 is a plan view of the device, and

Fig. 5 is an enlarged detail view of the spring-stop member.

My invention is shown as designed for use with a trolley car 6 of the safety type which has a low roof and, consequently, a considerable amount of space between the roof of the car and a trolley wire 7.

The device consists of a casing member 8 flared at its lower end and provided with a series of bolt holes 9 by which it is fastened to the roof of the car.

The casing member 8 has a channel 10 in its upper end for the reception of a ball race 11 containing a series of balls 12. A bearing ring member 13 coacts with the balls 12 and the ball race 11 to form an antifriction bearing, and a cover or shield 14 is provided to prevent access of dirt or moisture to the ball bearing.

A cylindrical member 15 is rotatably mounted within the casing 8 and has a snug fit with the bearing ring 13 so that it rotates therewith. At its upper end, the cylinder 8 is provided with a flange 16 which, in addition to positioning the cylinder with respect to the casing 8, also carries pivotal supports for the trolley-pole socket 17 and a latch 18. At its lower end, the cylinder 15 is engaged by the casing 8, and, by reason of this bearing and the ball bearing above referred to, the cylinder and casing are rotative with respect to one another, and, by reason of the length of the cylinder 15, there is no tendency for it to bind at its lower end, under lateral strains. The cylinder 15 is slightly reduced in size between the ends, as indicated at 19, to leave a space between it and the casing 8 for the insertion of lubricant.

At its upper end, the cylinder is provided with four inturned lugs or portions 20 (Fig. 4). These lugs are so arranged as to permit the insertion and retention thereon of the spring-stop member 21. The stop member 21 is provided with lugs 22 and shoulder portions 23. To insert the stop member, it is turned so that the lugs are alined longitudinally of the trolley pole and it is then pressed downwardly against the spring in the cylinder and given a quarter turn, so that it is brought into the position shown more clearly in Fig. 4, and the lugs 22 occupy the spaces between adjacent pairs of projections 20, and the shoulders 23, by reason of the spring pressure on the under side of the stop member, abut against the under side of projections 20.

The spring stop 21 serves to retain a spring 24 within the cylinder 15. At its lower end, the spring is supported by a seat 25 which has a lug 26 extending into a slot 27 in the wall of the cylinder 15, so that it will be nonrotative with respect to the cylinder. The cylinder has holes 28 in the bottom thereof through which moisture that finds its way into the upper end of the cylinder may flow away.

The pole socket 17 is pivoted at 29 to a projection 30 on the cylinder, and the latch member 18 is pivoted to a projection 31 on the cylinder.

The socket 17 has an arm 32 extending across the upper end of the cylinder 15 and is provided with a curved face 33 (Fig. 3) to furnish a bearing for the curved underside of a jib member 34 supported by the head of a bolt 35 which extends into the cylinder and supports the spring seat 25, at its other end.

From the foregoing description, it will be clear that the spring-stop member 21 is held against upward movement with respect to the cylinder 15, and that the trolley-pole socket 17 rests upon the upper end of the cylinder 15 and thereby retains it in place when the spring seat 25 is drawn upwardly to compress the spring, and that the spring is placed under compression by pulling the trolley pole in a direction from the vertical to the horizontal. When the trolley pole is drawn below its horizontal position, the latch member 18 will fall into engagement with the end of the arm 32, as indicated by the dotted lines in Fig. 3, and, therefore, will lock the trolley pole in its retracted position. This locking engagement serves to securely hold all of its parts in position, when the base is being placed upon the car or is being removed therefrom.

The car roof carries a pair of hook members 40 which are utilized, in the usual manner, to maintain the trolley poles in inoperative position.

It will be seen also that the trolley pole, by reason of the rotative mounting of the cylinder 15 within the casing 8, is free to move easily in a horizontal plane and that the spring 24 acts to normally exert tension thereon in a vertical plane and to normally maintain constant engagement of the trolley wheel with the trolley wire.

The arrangement of parts is such that the base may be readily assembled and disassembled for renewals or repairs, and it may be fully assembled before it is placed on the car.

Various changes might be made in the device without avoiding the invention as defined in the accompanying claims.

I claim as my invention:—

1. A trolley base comprising an upright casing having an upwardly disposed annular recess adjacent its upper edge, anti-friction bearings in said recess, a cylindrical member lying in the casing and provided with an outwardly extending flange disposed about its upper end in position to rest upon the antifriction bearings and with inwardly extending lugs, a spring seat slidably supported within the cylindrical member, a spring-stop member placed beneath the lugs, a spring interposed between the said seat and stop member, a trolley pole pivotally mounted upon the upper end of the cylindrical member and having an arm lying across the end of said member, and a bolt connecting the said arm to the spring seat, whereby tension exerted by the spring on its seat is transmitted to the trolley pole.

2. A trolley base comprising a casing member, a cylindrical member rotatably mounted therein and having inwardly projecting lugs adjacent its upper end, a spring seat slidably supported within the cylindrical member, a spring-stop member adapted to engage with the under side of said lugs, a spring interposed between the said seat and the stop member, a trolley pole, a trolley-pole socket pivotally supported on the upper end of the cylindrical member and having an arm extending partially across the upper end of the cylindrical member, and a bolt having one of its ends secured to the spring seat and its other end engaged by the said arm, whereby compression of the spring between the spring-stop member and the spring seat places the trolley pole under tension, the said lugs being diametrically spaced a distance greater than the outside diameter of the spring, so that the spring may be removed therebetween when the said stop member has been removed.

3. A trolley base comprising an upright casing, provided with a bearing surface adjacent to its upper edge, a cylindrical member lying in the casing and provided with an outwardly extending flange disposed about its upper end in position to serve as a bearing member for co-operating with the bearing surface on the casing and also provided with inwardly extending lugs adjacent to its upper end, a spring seat slidably supported within the cylindrical member, a spring interposed between the seat and the lugs, a trolley pole pivotally mounted upon the upper end of the cylindrical member and having an arm lying across the end of said member, a bolt connecting the said arm to the spring seat, whereby tension exerted by the spring on its seat is transmitted to the trolley pole, and a latch carried by the cylindrical member for locking the pole down against the compression of the spring.

4. A trolley base comprising an upright substantially tubular casing, provided with a bearing surface adjacent to its upper edge, a cylindrical member lying in the casing and provided with an outwardly extending flange disposed about its upper end in position to serve as a bearing member for co-operating with the bearing surface on the casing and also provided with inwardly extending lugs adjacent to its upper end, a spring seat slidably supported within the cylindrical member, a spring interposed between the seat and the lugs, a trolley pole pivotally mounted upon the upper end of the cylindrical member and having an arm lying across the end of said member, a bolt connecting the said arm to the spring seat, whereby tension exerted by the spring on its seat is transmitted to the trolley pole, and a latch carried by the cylindrical member for locking the pole down against the compression of the spring.

5. A trolley base comprising an upright substantially tubular casing, provided with a bearing surface adjacent to its upper edge, a cylindrical member lying in the casing and provided with an outwardly extending flange disposed about its upper end in position to serve as a bearing member for co-operating with the bearing surface on the casing and also provided with inwardly extending lugs adjacent to its upper end, a spring seat slidably supported within the cylindrical member, a spring interposed between the seat and the lugs, a trolley pole pivotally mounted upon the upper end of the cylindrical member and having an arm lying across the end of said member, a bolt connecting the said arm to the spring seat, whereby tension exerted by the spring on its seat is transmitted to the trolley pole, and a latch carried by the cylindrical member for locking the pole down against the compression of the spring, the cylindrical member being of such diameter at its lower end and of such length that its lower end co-operates with the inner wall of the tubular member to form a bearing therebetween.

6. A trolley base comprising an upright casing provided with a bearing surface adjacent to its upper edge, a cylindrical member lying in the casing and provided with an outwardly extending flange disposed about its upper end in position to serve as a bearing member for co-operating with the bearing surface on the casing and also provided with inwardly extending lugs adjacent to its upper end, a spring seat slidably but nonrotatably supported within the cylindrical member, a spring interposed between the seat and the lugs, a trolley pole pivotally mounted within the upper end of the cylindrical member and having an arm lying across the end of said member, a bolt connecting the said arm to the spring seat, whereby tension exerted by the spring on its seat is transmitted to the trolley pole, and a latch carried by the cylindrical member for locking the pole down against the compression of the spring.

In testimony whereof, I have hereunto subscribed my name this first day of October, 1920.

WILLIAM SCHAAKE.